(12) United States Patent
Shun et al.

(10) Patent No.: US 11,187,599 B2
(45) Date of Patent: *Nov. 30, 2021

(54) STRAIN BODY AND FORCE SENSOR PROVIDED WITH THE STRAIN BODY

(71) Applicant: NIDEC COPAL ELECTRONICS CORPORATION, Tokyo (JP)

(72) Inventors: Subei Shun, Sano (JP); Takashi Suzuki, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 16/549,208

(22) Filed: Aug. 23, 2019

(65) Prior Publication Data

US 2019/0376856 A1 Dec. 12, 2019

Related U.S. Application Data

(63) Continuation of application No. PCT/JP2017/042908, filed on Nov. 29, 2017.

(30) Foreign Application Priority Data

Feb. 24, 2017 (JP) .............................. JP2017-033438

(51) Int. Cl.
*G01L 1/22* (2006.01)
*G01L 1/26* (2006.01)

(52) U.S. Cl.
CPC .......... *G01L 1/2237* (2013.01); *G01L 1/2262* (2013.01); *G01L 1/26* (2013.01)

(58) Field of Classification Search
CPC ........ G01L 1/2237; G01L 1/2262; G01L 1/26
See application file for complete search history.

(56) References Cited

U.S. PATENT DOCUMENTS

| 3,272,006 A | 9/1966 | Eckard | |
|---|---|---|---|
| 4,448,083 A * | 5/1984 | Hayashi | .................. G01L 5/162 |
| | | | 73/862.042 |

(Continued)

FOREIGN PATENT DOCUMENTS

| CN | 101089567 | 12/2007 |
|---|---|---|
| CN | 101419102 | 4/2009 |

(Continued)

OTHER PUBLICATIONS

Office Action issued in CN Application No. 201780087152.1, dated Sep. 22, 2020.

(Continued)

*Primary Examiner* — Max H Noori
(74) *Attorney, Agent, or Firm* — Burris Law, PLLC

(57) ABSTRACT

A strain body according to the embodiments includes a central portion, an outer peripheral portion, connecting portions each includes a first connecting portion adjacent to the outer peripheral portion and a second connecting portion adjacent to the central portion, strain sensors provided on main surfaces of the connecting portions, reference resistors provided on a main surface of the central portion, and a strain increasing portion configured to increase strain occurring at the first connecting portion more than strain occurring at the second connecting portion, on a back surface side opposed to the main surface of the first connecting portion.

8 Claims, 15 Drawing Sheets

(56) References Cited

U.S. PATENT DOCUMENTS

| | | | | |
|---|---|---|---|---|
| 5,092,645 | A | * | 3/1992 | Okada .................. B25J 13/085 294/119.1 |
| 5,526,700 | A | | 6/1996 | Akeel |
| 7,743,672 | B2 | * | 6/2010 | Kurtz ....................... G01N 3/08 73/862.046 |
| 2004/0045372 | A1 | * | 3/2004 | Liu ........................... G01L 1/22 73/862.041 |
| 2007/0089536 | A1 | | 4/2007 | Morimoto |
| 2008/0276726 | A1 | | 11/2008 | Rey |

FOREIGN PATENT DOCUMENTS

| | | |
|---|---|---|
| CN | 101672705 | 3/2010 |
| CN | 102095534 | 6/2011 |
| CN | 103292939 | 9/2013 |
| CN | 109791083 | 5/2019 |
| CN | 110325831 | 10/2019 |
| EP | 1688726 | 8/2006 |
| EP | 1739401 | 1/2007 |
| JP | S6469927 | 3/1989 |
| JP | 2005140727 | 6/2005 |
| JP | 2008533481 | 8/2008 |
| JP | 2010008343 | 1/2010 |
| JP | 2011227015 | 11/2011 |
| JP | 2013061305 | 4/2013 |
| JP | 2015049209 | 3/2015 |
| KR | 100347334 | 8/2002 |
| RU | 2175117 | 10/2001 |

OTHER PUBLICATIONS

Partial Supplementary European Search Report issued in EP Application No. 17898267.4, dated Nov. 17, 2020.
International Search Report for International Application PCT/JP2017/042908, dated Dec. 26, 2017.

* cited by examiner

| Force and Moment | Fx | Fy | Fz | Mx | My | Mz |
|---|---|---|---|---|---|---|
| Detection circuits | BF3 | BF1 | BF2 | BF4 | BF2 | BF1 |
|  | BF7 | BF5 | BF6 | BF8 | BF6 | BF5 |
|  |  |  | BF4 |  |  | BF3 |
|  |  |  | BF8 |  |  | BF7 |

FIG. 6

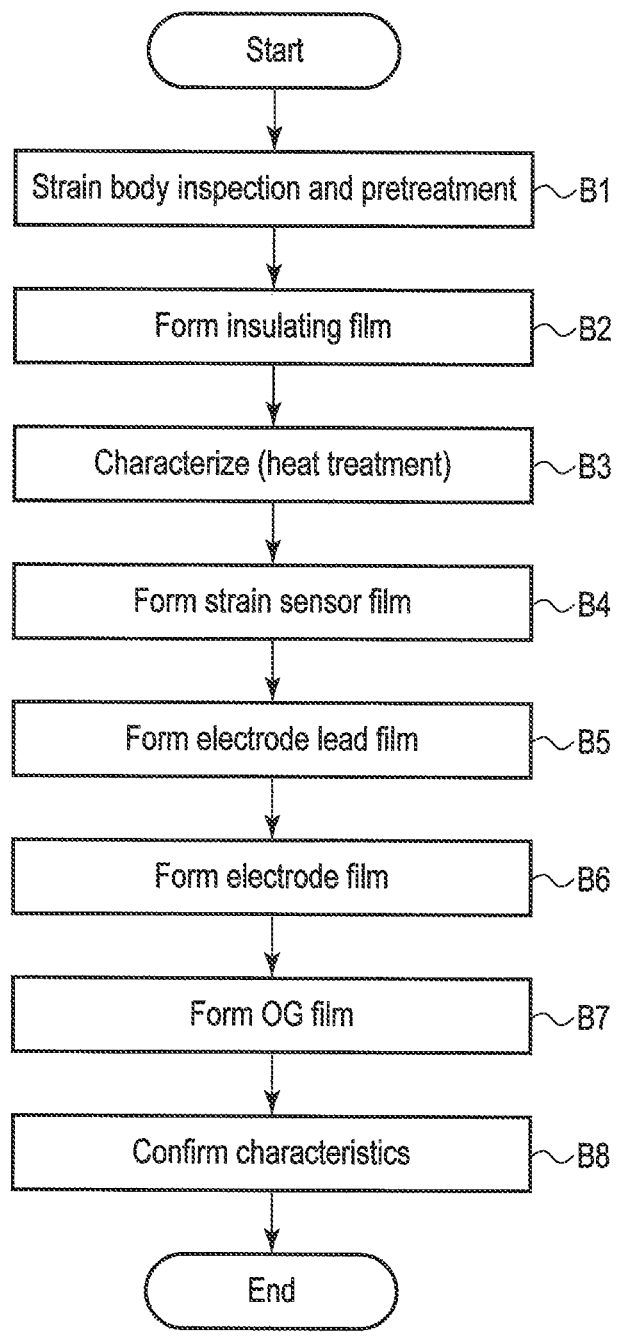
F I G. 7

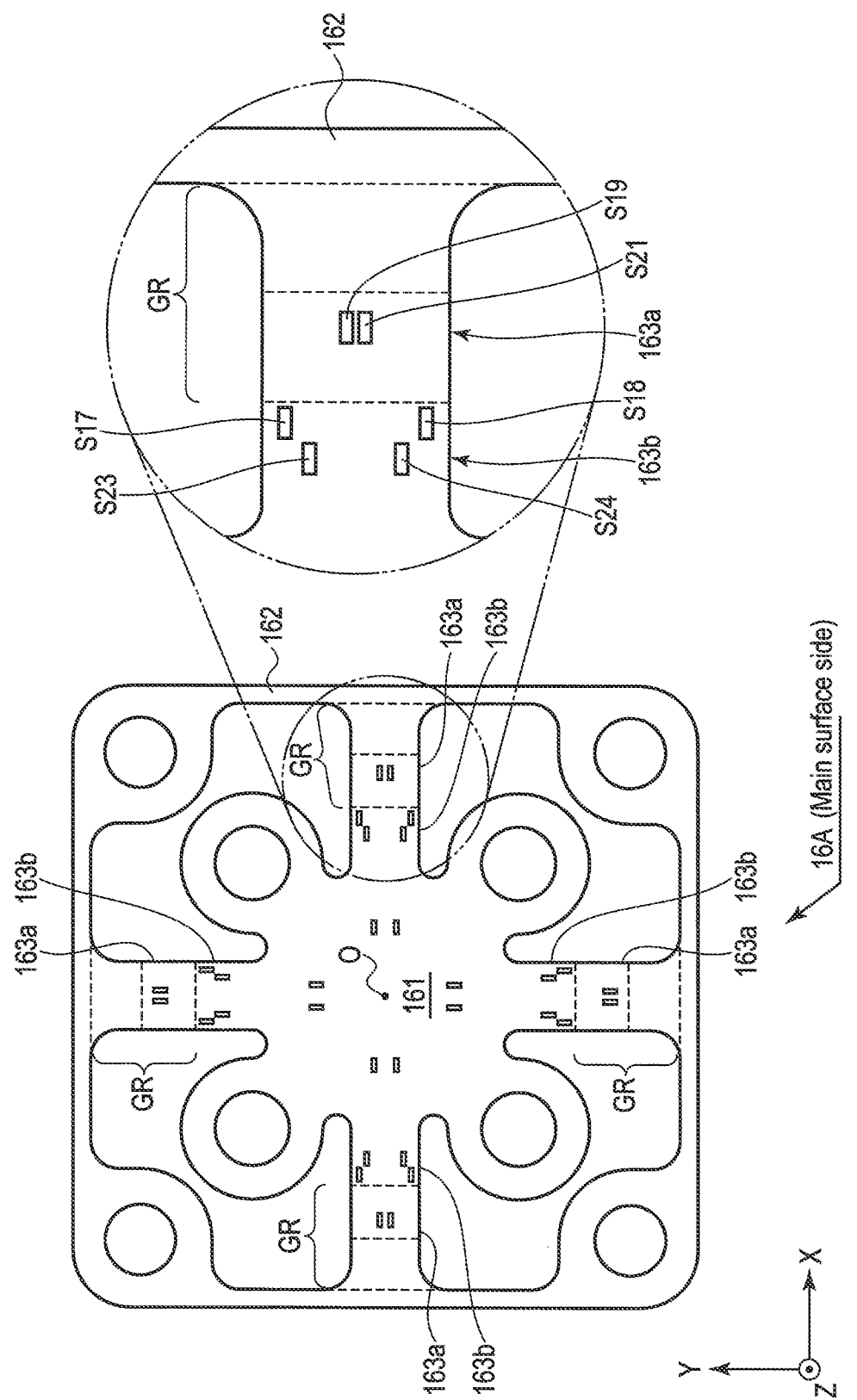
F I G. 10

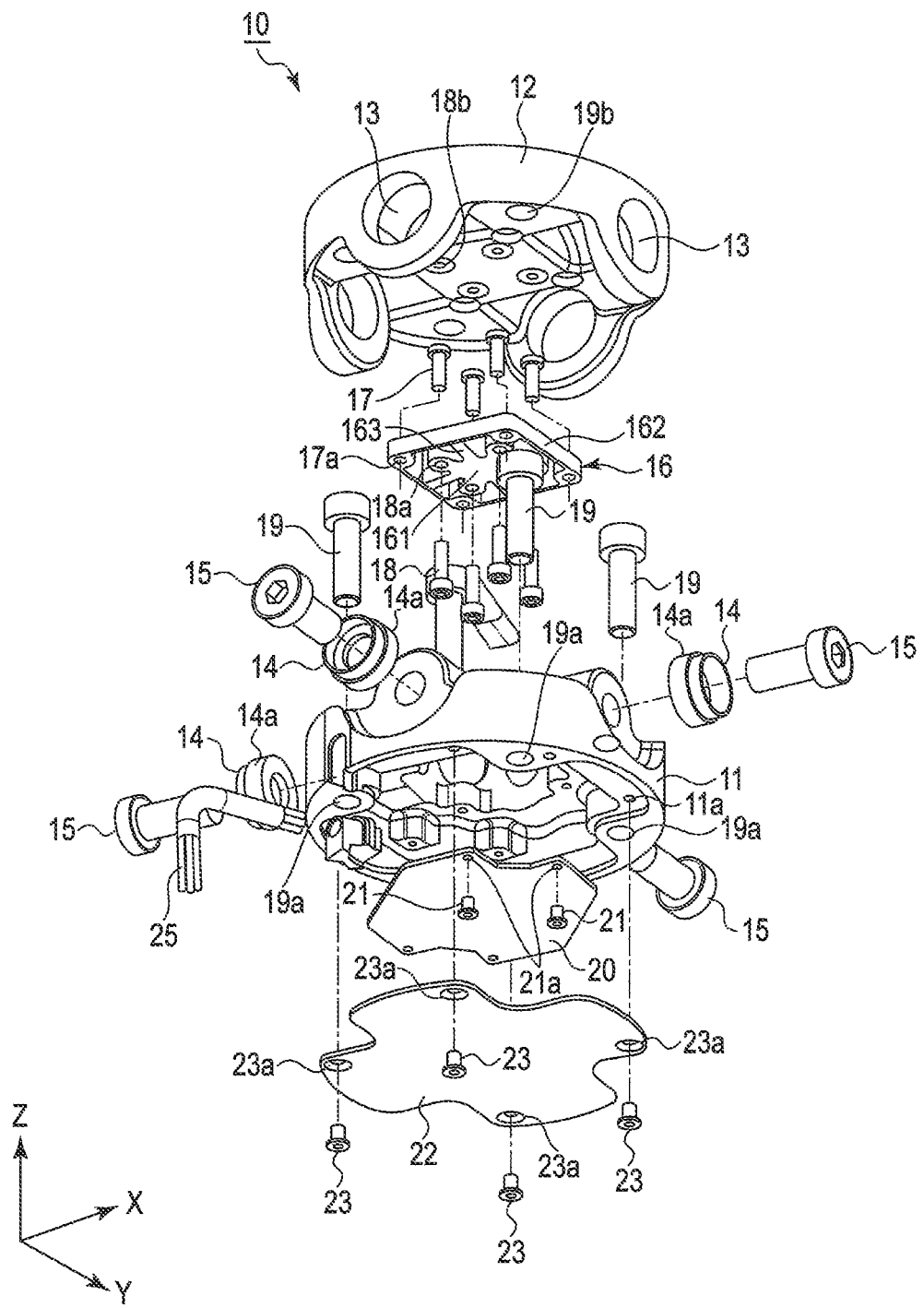
F I G. 12

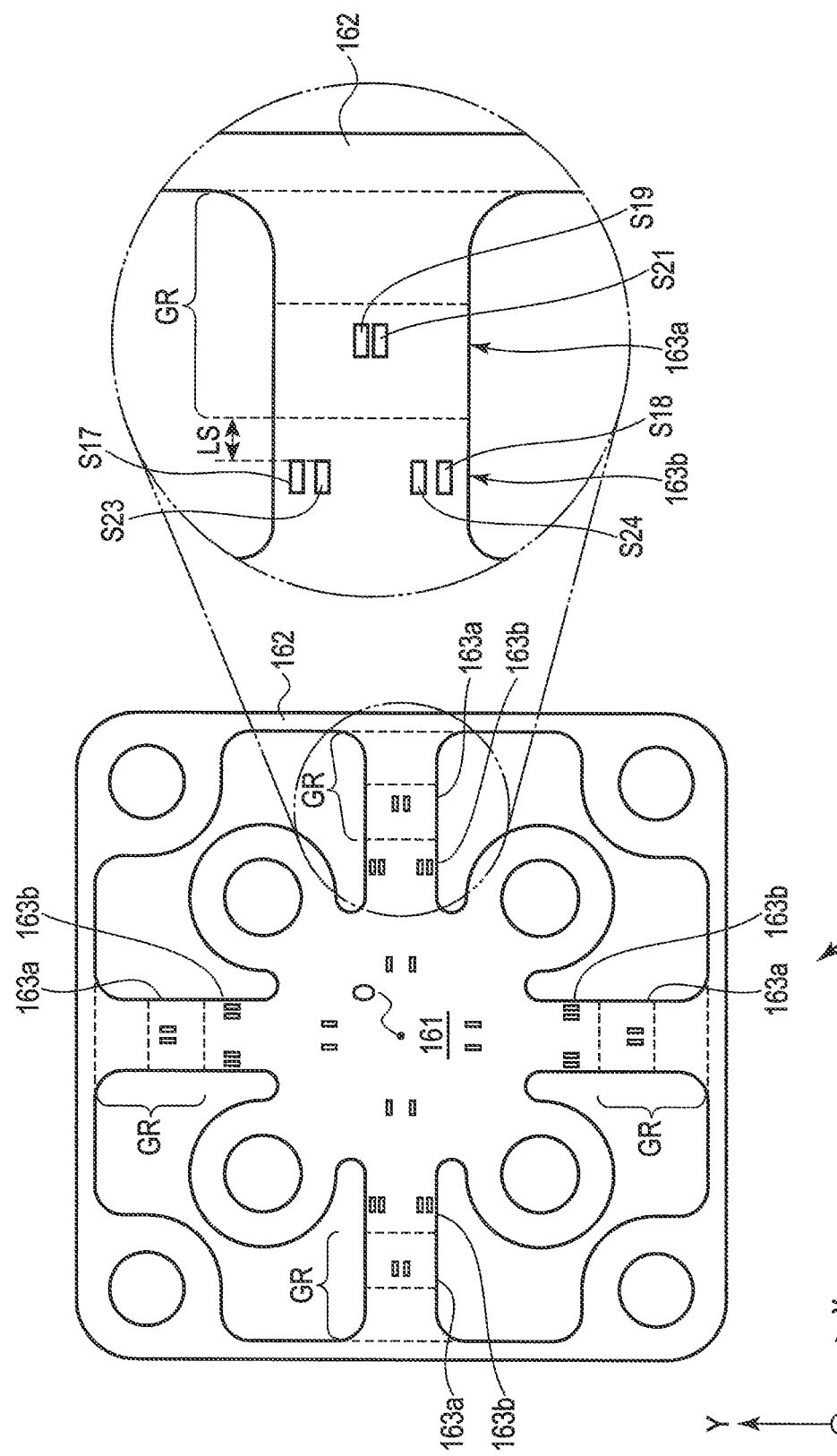
F I G. 19

STRAIN BODY AND FORCE SENSOR PROVIDED WITH THE STRAIN BODY

CROSS-REFERENCE TO RELATED APPLICATIONS

This application is a continuation of International Application No. PCT/JP2017/042908, filed on Nov. 29, 2017, which claims priority to and the benefit of Japanese Patent Application No. 2017-033438, filed on Feb. 24, 2017. The disclosures of the above applications are incorporated herein by reference.

FIELD

The present disclosure relates generally to, for example, a six-axis force sensor, etc., provided with a strain body and applicable to a robot arm.

BACKGROUND

Six-axis force sensors which are used in, for example, robot arms, to detect an external force and torque in X, Y, and Z directions have been known (refer to, for example, Patent Literature 1 (JP 2013-061305 A)).

In such a force sensor, an external force applied to a force receiving body serving as a movable unit is transmitted to a strain body, and deformation of a strain sensor (strain gauge) provided on the strain body is converted into an electric signal and detected.

The range of application of the strain body provided with such a strain sensor tends to extend in accordance with progress of computer technologies and information communication technologies of these days, and further downsizing and higher performance of the strain body are required.

SUMMARY

Embodiments of the present invention described herein provide a strain body and a force sensor provided with the strain body, capable of increasing the detection accuracy in consideration of the above-described circumstances.

A strain body according to the embodiments includes a central portion, an outer peripheral portion surrounding the central portion, connecting portions connecting the central portion and the outer peripheral portion, and each comprising a first connecting portion (i.e., first portion) adjacent to the outer peripheral portion and a second connecting portion (i.e., second portion) adjacent to the central portion, strain sensors provided on main surfaces of the connecting portions, reference resistors provided on a main surface of the central portion, and constructing a bridge circuit with the strain sensors, and a strain increasing portion configured to increase strain occurring at the first connecting portion more than strain occurring at the second connecting portion, on a back surface side opposed to the main surface of the first connecting portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 is a figure showing a relationship between a detection circuit and the detected force and moment.

FIG. 7 is a flowchart illustrating at method of manufacturing the strain body according to the first embodiment.

FIG. 10 is a perspective view showing an overall structure of a strain body according to a second embodiment as viewed from its main surface side.

FIG. 12 is an exploded perspective view of the force sensor in FIG. 11.

FIG. 19 is a perspective view showing an overall structure of a strain body according to a fourth embodiment as viewed from its main surface side.

DETAILED DESCRIPTION

Figure 1:
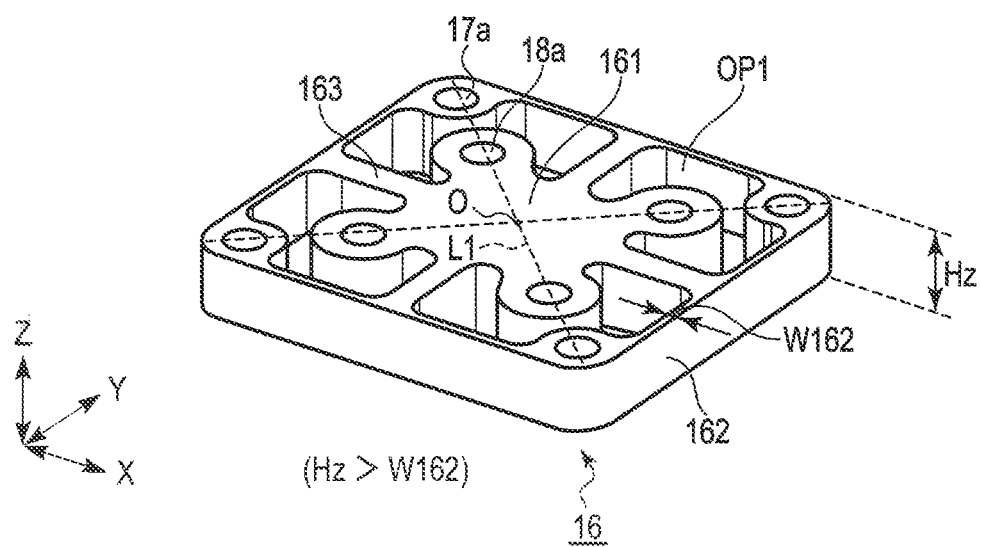
FIG. 1 is a perspective view showing an overall structure of a strain body according to a first embodiment.

The Embodiments will be described hereinafter with reference to the accompanying drawings. In the following description, substantially the same functions and elements will be denoted by the same reference numerals, and will be described as necessary. In addition, the drawings are schematic, and the relationship between thicknesses and planar dimensions, the ratio between the thicknesses of layers, etc., may be different from those in reality.

First Embodiment

[Structure]
Overall Structure

Figure 2:
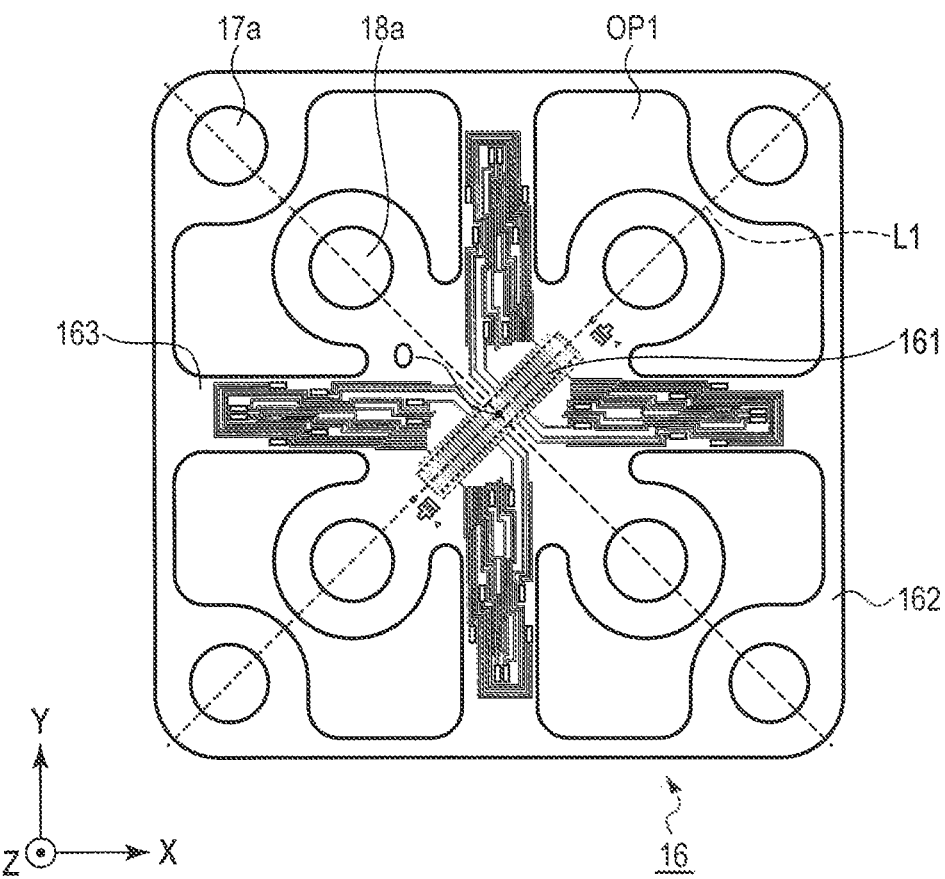
FIG. 2 is a plan view showing a planar structure of the strain body in FIG. 1.

An overall structure of a strain body according to a first embodiment will be described with reference to FIG. 1 and FIG. 2. FIG. 1 is a perspective view showing the whole structure of the strain body according to the first embodiment. FIG. 2 is a plan view showing the planar structure of the strain body in FIG. 1.

As shown in FIG. 1 and FIG. 2, a strain body 16 according to the first embodiment comprises a central portion 161, an outer peripheral portion 162 which surrounds the periphery of the central portion 161, and four connecting portions 163 which connect the central portion 161 and the outer peripheral portion 162. The strain body 16 is formed of, for example, a predetermined metal such as stainless steel.

The central portion 161 includes a center O, which is the intersection of two diagonal lines L1 connecting the corner portions of the outer peripheral portion 162. In addition, a plurality of reference resistors for constructing bridge circuits, which will be described later, are provided in the central portion 161. Four screw holes 18a for fixing a first support member which is an external member are provided in the corner portions of the central portion 161. Each of the screw holes 18a is provided to protrude in a hollow portion OP1 from the center side to the outside along the directions of the diagonal lines L1 for the purpose of saving space.

Four screw holes 17a for fixing a second support member different from the first support member which is an external member are provided in the corner portions of the outer peripheral portion 162. Each of the screw holes 17a is provided to protrude in the hollow portion OP1 from the outside to the center side along the directions of the diagonal lines L1 for the purpose of saving space.

Four connecting portions 163 are provided radially from the center O along the X direction or Y direction. A plurality of strain sensors for detecting external force and torque in X, Y, and Z directions, which are not shown in the drawings, are provided in the connecting portions 163. The width of the connecting portions 163 is formed to be approximately the same from the center O side toward the outside.

In addition, since the height Hz of the strain body 16 along the Z direction is common to the central portion 161, the outer peripheral portion 162, and the connecting portions 163, the height is substantially the same. The height Hz of the strain body 16 is formed to be greater than the width W162 of the outer peripheral portion 162 along the X direction or the Y direction (Hz>W162).

Furthermore, the elasticity of the outer peripheral portion 162 and the connecting portions 163 is formed to be greater than the elasticity of the central portion 161. More desirably, the outer peripheral portion 162 and the connecting portions 163 are formed to have an elastic function, and the central portion 161 is formed to have no elastic function. The elastic function means a function of positively causing elastic deformation with input external force and torque.

More specifically, the amount of strain of the elastic deformation of the central portion 161 is, preferably, less than or equal to $3\times10^{-6}$ at a rated load, and more preferably, less than or equal to $1\times10^{-6}$. The elastic deformation of the connecting portions (beam portions) 163 is within the elastic limit of a material at a rated load, and the strain amount is, desirably, greater than or equal to $2\times10^{-5}$, and more desirably, greater than or equal to $2\times10^{-4}$. The elastic deformation of the outer peripheral portion 162 is within the elastic limit of a material at a rated load, and the amount of flexure of the most flexed portion is, preferably, greater than or equal to 20 μm, and more desirably, greater than or equal to 50 μm.

Detailed Structure

Figure 3:
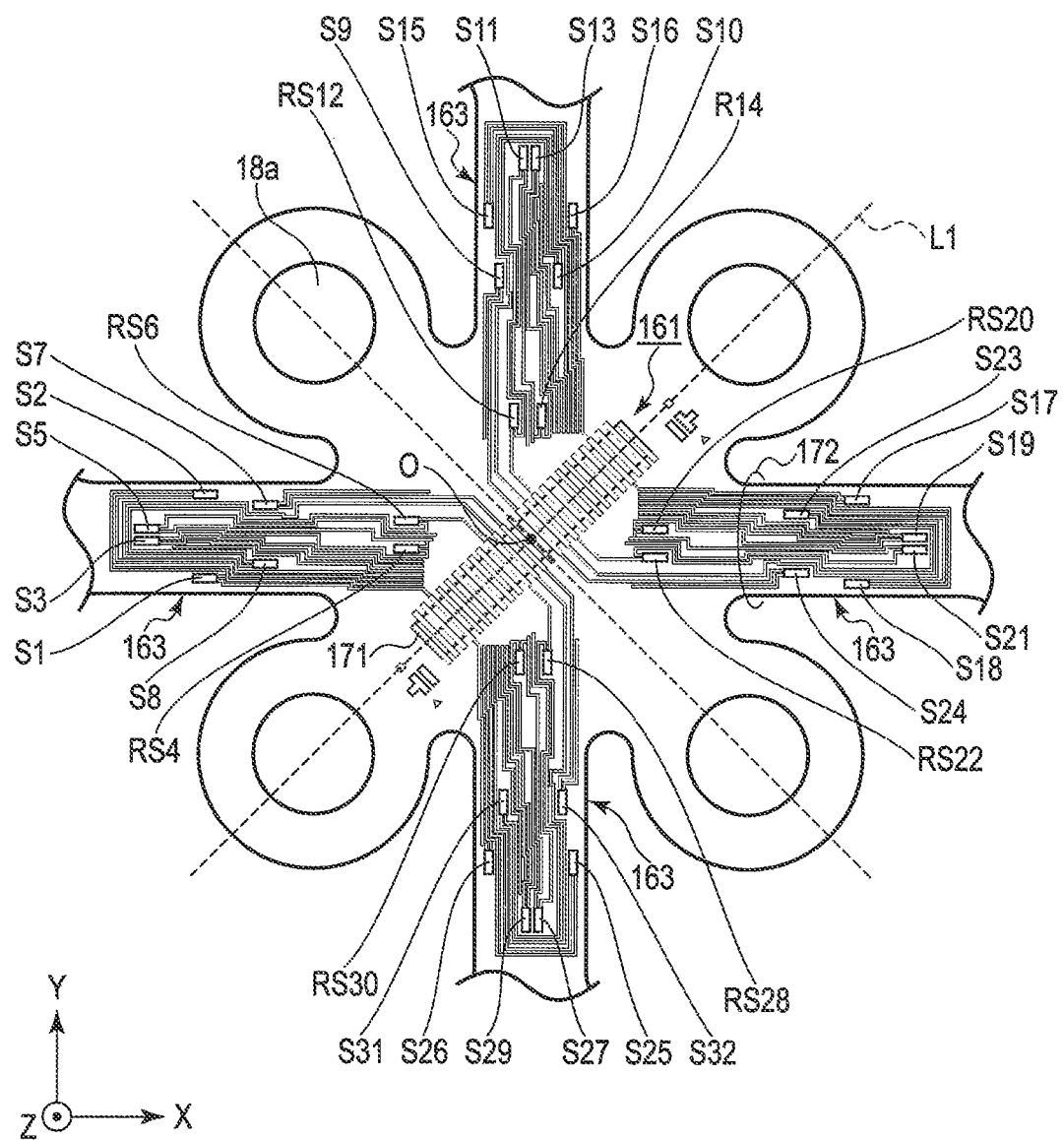
FIG. 3 is a plan view showing details of a central portion and connecting portions as viewed from the main surface side of the strain body in FIG. 1.

The detailed planar structure of the strain body 16 according to the first embodiment will be described with reference to FIG. 3. FIG. 3 is a plan view showing the central portion 161 and the connecting portions 163 from the perspective of the main surface side of the strain body 16, on which the strain sensors, etc., are provided, in detail.

As shown in FIG. 3, twenty-four strain sensors (strain gauges) S1, S2, S3, S5, S7, S8, S9, S10, S11, S13, S15, S16, S17, S18, S19, S21, S23, S24, S25, S26, S27, S29, S31, and S32 are provided on the main surfaces of the connecting portions 163. The strain sensors S1 to S32 are metallic thin-film resistive elements as described later and are, for example, resistive elements (Cr—N resistive elements) containing chromium (Cr) and nitrogen (N). For this reason, the plurality of strain sensors S1 to S32 can be disposed at desired positions only by patterning as described later. In addition, since the temperature coefficients of the Cr—N resistive elements are small, temperature compensation can easily be made. The longitudinal direction of the strain sensors S1 to S32 is formed to be the X direction or the Y direction.

Eight reference resistors RS4, RS6, RS12, RS14, RS20, RS22, RS28, and RS30 are provided on the main surface of the central portion 161. The shape and material of the reference resistors RS4 to RS30 are substantially the same as those of the strain sensors S1 to S32, and their longitudinal direction is formed to be the X direction or the Y direction. Moreover, an electrode 171 is provided along one of the directions of the diagonal lines L1 of the central portion 161, on the main surface of the central portion 161.

A wire 172 is arranged on the main surface such that the strain sensors and the reference resistors construct four bridge circuits as described later and that the strain sensors construct four full-bridge circuits as described later. The wire 172 is electrically connected to a predetermined terminal of the electrode 171. The line width of the wire 172 is formed to be smaller at portions connecting the strain sensors S1 to S32 and the reference resistors RS4 to RS30 and to be larger than the connecting portions to reduce the line resistance at the other portions.

Moreover, the strain sensors S1 to S32, the reference resistors RS4 to RS30, the electrode 171, and the wire 172 are integrally formed on the same main surface of the strain body 16 by a manufacturing method employing a thin-film technique as described later. For this reason, the strain sensors S1 to S32, the reference resistors RS4 to RS30, the electrode 171, and the wire 172 are formed in a layout of having mirror symmetry with respect to the diagonal lines L1 of the strain body 16.

Figure 4:
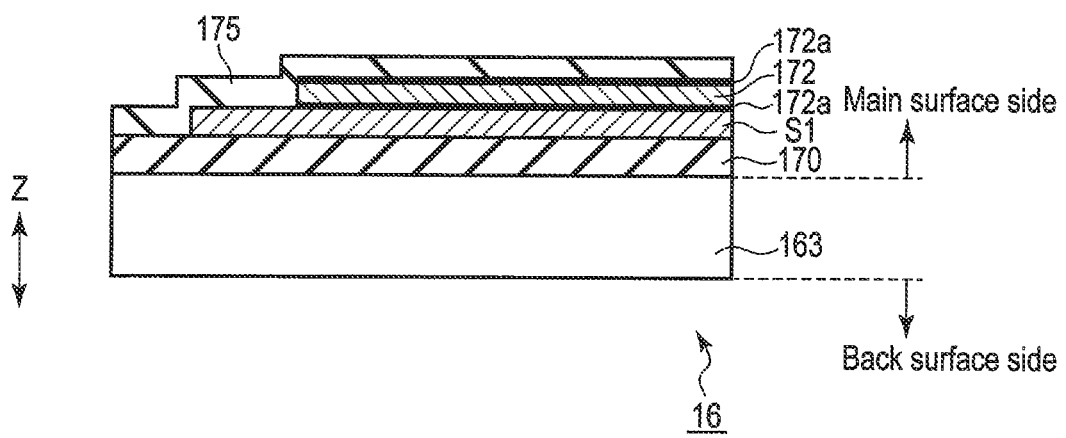
FIG. 4 is a cross-sectional view of the connecting portion including a strain sensor in FIG. 3.

The detailed cross-sectional structure of the strain body 16 will be described with reference to FIG. 4. FIG. 4 is a cross-sectional view of the connecting portion 163 including the strain sensor S1 in FIG. 3.

As shown in FIG. 4, an insulating film 170 is provided on the main surface of the connecting portion 163. The strain sensor S1, which is a Cr—N resistive element serving as a strain sensitive film, is provided on the insulating film 170. The wire 172, which is an electrode lead film formed of copper (Cu), is provided on the strain sensor S1. An overglass (OG) film 175 is provided so as to cover the strain sensor S1 and the wire 172. In addition, an adhesive film 172a containing chromium (Cr) to improve adhesion is provided on the interface between the wire 172 and the strain sensor S1 and the interface between the wire 172 and the OG film 175.

The electrode 171 connected to the wire 172 at the central portion 161 is formed of a multilayer structure of copper (Cu) and gold (Au) sequentially provided on an adhesive film 172a, though not illustrated in the cross-section.

Bridge Circuits and Full-Bridge Circuits

Figure 5:
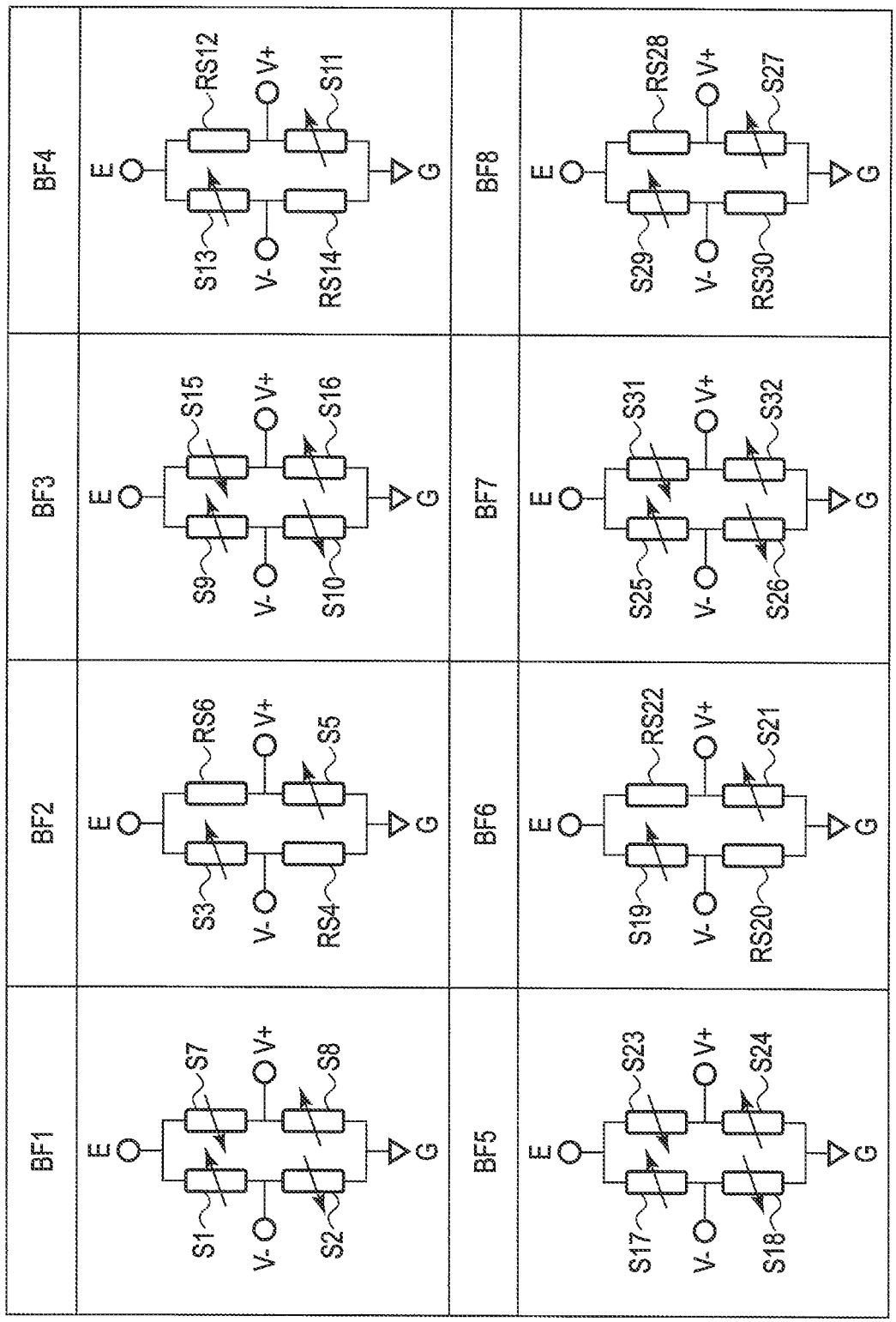
FIG. 5 is a circuit diagram illustrating bridge circuits and full-bridge circuits of the strain body according to the first embodiment.

FIG. 5 is a circuit diagram showing bridge circuits and full-bridge circuits of the strain body 16 according to the first embodiment.

As shown in FIG. 5, the strain body 16 comprises four bridge circuits BF2, BF4, BF6, and BF8 and four full-bridge circuits BF1, BF3, BF5, and BF7.

The bridge circuit BF2 comprises two strain sensors (first strain sensors) S3 and S5 and two reference resistors RS4 and RS6. The strain sensor S3 and the reference resistor RS4, and the reference resistor RS6 and the strain sensor S5 are connected in series, sequentially, between the power supply terminal E and the ground G. The strain sensor S3 and the reference resistor RS4, which are connected in series, and the reference resistor RS6 and the strain sensor S5, which are connected in series, are connected in parallel between a power supply terminal E and a ground G. A terminal V− is connected to a connection between the strain sensor S3 and the reference resistor RS4. The other terminal V+ is connected to a connection between the reference resistor RS6 and the strain sensor S5. The other bridge circuits BF4, BF6, and BF8 are constructed similarly to the bridge circuit BF2.

The full-bridge circuit BF1 is composed of four strain sensors (second strain sensors) S1, S2, S7, and S8. The strain sensors S1 and S2, and the strain sensors S7 and S8, are connected in series, sequentially, between the power supply terminal E and the ground G. The strain sensors S1 and S2, which are connected in series, and the strain sensors S7 and S8, which are connected in series, are connected in parallel between the power supply terminal E and the ground G. A terminal V− is connected to a connection between the strain sensors S1 and S2. The other terminal V+ is connected to a connection between the strain sensors S7 and S8. The other full-bridge circuits BF3, BF5, and BF7 are constructed similarly to the full-bridge circuit BF1.

In the above-described structure, when the force and torque (moment) are applied from the outside, the position of the central portion 161 changes relatively to the position of the outer peripheral portion 162, and the connecting portions 163 are thereby deformed in accordance with the force and torque. In accordance with the deformation of the connecting portions 163, stress is applied to each of the strain sensors S1 to S32 provided in the connecting portions 163, and the balance of the voltages of the terminals V− and V+ of each of the bridge circuits and each of the full-bridge circuits is lost, and a predetermined detection signal corresponding to the force and torque is detected.

In addition, FIG. 6 is a figure showing a relationship between a detection circuit and the detected force and moment. As shown in FIG. 6, the full-bridge circuits BF3 and BF7 detect force Fx in the X direction and moment Mz in the Z direction. The full-bridge circuits BF1 and BF5 detect force Fy in the Y direction and moment Mz in the Z direction. The bridge circuits BF2 and BF6 detect force Fz in the Z direction and moment My in the Y direction. The bridge circuits BF4 and BF8 detect force Fz in the Z direction and moment Mx in the X direction. The above-described structure enables the six-axis force and torque to be detected.

[Manufacturing Method]

FIG. 7 is a flowchart for explanation of the method of manufacturing the strain body 16 according to the first embodiment.

As shown in FIG. 7, a predetermined test such as a test of the dimensions of the strain body 16 is first carried out, and then, the strain body 16 is subjected to predetermined pretreatment. The pretreatment includes, for example, washing treatment of the main surface of the strain body 16 after the test with ultrasonic waves, a predetermined agent, and the like (B1).

Then, the insulating film 170 is formed on the main surface of the strain body 16 after the pretreatment by, for example, a thermal oxidation method (B2).

Then, for example, the strain body 16 is subjected to heat treatment employing a predetermined annealing treatment, and characterized such that properties such as an insulation property, of the formed insulating film 170, are a predetermined value or more (B3).

Then, a Cr—N thin film including chromium (Cr) and nitrogen (N) is formed on the insulating film 170 by, for example, a sputtering method using a predetermined target. Moreover, a photoresist is coated on the formed Cr—N thin film, and the coated photoresist is subjected to patterning. More specifically, a pattern having the same planar shape as that of the reference resistors RS4 to RS30 is transferred to the photoresist at the position where the reference resistors RS4 to RS30 of the central portion 161 are disposed, the pattern having the same planar shape as the strain sensors S1 to S32 is transferred to the photoresist at the position where the strain sensors S1 to S32 of the connecting portion 163 are disposed, and the photoresist other than the portion where the pattern is transferred is removed to develop the pattern. Furthermore, a predetermined etching process is performed on the surface of the insulating film 170 using the photoresist on which the pattern is developed as a mask, and the reference resistors RS4 to RS30 and the strain sensors S1 to S32 having desired shapes are thereby formed at predetermined positions on the central portion 161 and the connecting portion 163 (B4).

Subsequently, an adhesive film 172a of a chromium (Cr) thin film for enhancing adhesion is formed on the central portion 161 and the connecting portion 163 using, for example, the same manufacturing process as step B4, etc., and a predetermined electrode lead film containing copper (Cu) is formed on the adhesive film 172a to form the wire 172 for electrically connecting the strain sensors S1 to S32 and the reference resistors RS4 to RS30. Furthermore, an adhesive film 172a composed of chromium thin film is formed on the formed wire 172 by the same manufacturing process (B5).

Subsequently, a stacked structure of copper (Cu) and gold (Au) is sequentially formed on the adhesive film 172a at the end part of the wire 172 in the central portion 161, along the direction of one diagonal line L1, by using, for example, the same manufacturing process as step B4, and a predetermined electrode film is thereby formed to form an electrode 171 (B6).

Subsequently, the OG film 175 is formed on the main surface of the strain body 16 except on the electrode 171 by using, for example, a Chemical Vapor Deposition (CVD) method (B7).

Subsequently, the strain sensors S1 to S32 and the like formed on the main surface of the strain body 16 are subjected to predetermined strain properties inspection, stress inspection and the like, to confirm the properties required for the formed strain sensors S1 to S32 and the like (B8).

The strain body 16 according to the first embodiment is manufactured by the above manufacturing method.

[Functions and Advantages]

As described above, the strain body 16 according to the first embodiment is provided on the main surface of the central portion 161 substantially free from strain, and comprises a plurality of reference resistors RS4 to RS30 constructing the bridge circuits BF2, BF4, BF6 and BF8 together with the plurality of strain sensors S1 to S32 (FIG. 3). Thus, the reference resistors RS4 to RS30 are integrally provided on the main surface of the same strain body 16 as the strain sensors S1 to S32. As a result, the influence of the temperature error and the external noise generated between the strain sensors S1 to S32 and the reference resistors RS4 to RS30 can be reduced, and the detection accuracy can be improved.

Moreover, the strain body 16 according to the first embodiment is provided on the main surface of the connecting portion 163, and comprises the full bridge circuits BF1, BF3, BF5, and BF7 composed of parallel circuits in which a pair of serially connected strain sensors (second strain sensors) are connected in parallel (FIG. 5). For this reason, the sensitivity of the strain body 16 can be improved, and the detection accuracy can be improved. For example, in the case of the strain body 16 according to the first embodiment, since the full bridge circuits BF1, BF3, BF5, and BF7 occupy half of the entire detection circuit, the sensitivity and detection accuracy can be improved up to approximately twice as compared to the case where all the detection circuits are composed of bridge circuits.

In addition, the layout is formed such that the strain sensors S1 to S32, the reference resistors RS4 to RS30, the electrodes 171, and the wire 172 have mirror symmetry with respect to the diagonal line L1 of the strain body 16. Furthermore, since the width of the connecting portion 163 is formed to be substantially the same from the center O side to the outer side, space to arrange the strain sensors S1 to S32 can be extended as compared to a configuration in which the width decreases from the center O to the outer side (FIG. 3). Thus, the strain body 16 according to the first embodiment has an optimum configuration for arranging the strain sensors S1 to S32 and the like in a limited space on the main surface of the central portion 161 and the connecting portion 163.

Furthermore, the strain sensors S1 to S32, the reference resistors RS4 to RS30, the electrode 171, and the wire 172 are provided only on the main surface of strain body 16 by a manufacturing method using the thin film technology (FIG. 4 and FIG. 7). For this reason, high sensitivity sensors S1 to S32 can be provided at the connecting portion 163 of the strain body 16 with high density and high accuracy. Therefore, a large number of (for example, approximately ninety) strain sensors do not need to be arranged to compensate for the detection accuracy, and the strain sensors do not need to be applied on not only the surface of the strain body but also, for example, the side surfaces of the strain body, by using an adhesive or the like. For example, when the manufacturing method similar to the present embodiment is not used, influence of multiaxial interference in which forces and torques other than the specific axis are detected increases since the position of the strain sensor may cause an error of approximately several hundreds of μm from the desired position. In addition, for example, when the reference resistors are provided outside the strain body, the temperature error and the external noise also need to be corrected since the temperature error and the external noise increase. In the present embodiment, however, such a problem does not occur.

In addition, the height Hz of the strain body 16 along the Z direction is substantially the same in the central portion 161, the outer peripheral portion 162, and the connecting portion 163. The height Hz of the strain body 16 is formed to be greater than the width W162 of the outer peripheral portion 162 along the X direction or the Y direction (Hz>W162). Furthermore, the elasticity of the outer peripheral portion 162 and the connecting portions 163 is formed to be greater than the elasticity of the central portion 161. More desirably, the outer peripheral portion 162 and the connecting portion 163 are configured to have an elastic function and not to have the elastic function of the central portion 161. The above-described structure enables each output gain and each rigidity of the XYZ axes to be adjusted more appropriately.

Second Embodiment (Example of Providing a Strain Increasing Portion at a Connecting Portion on Back Surface Side of Strain Body)

Figure 8:
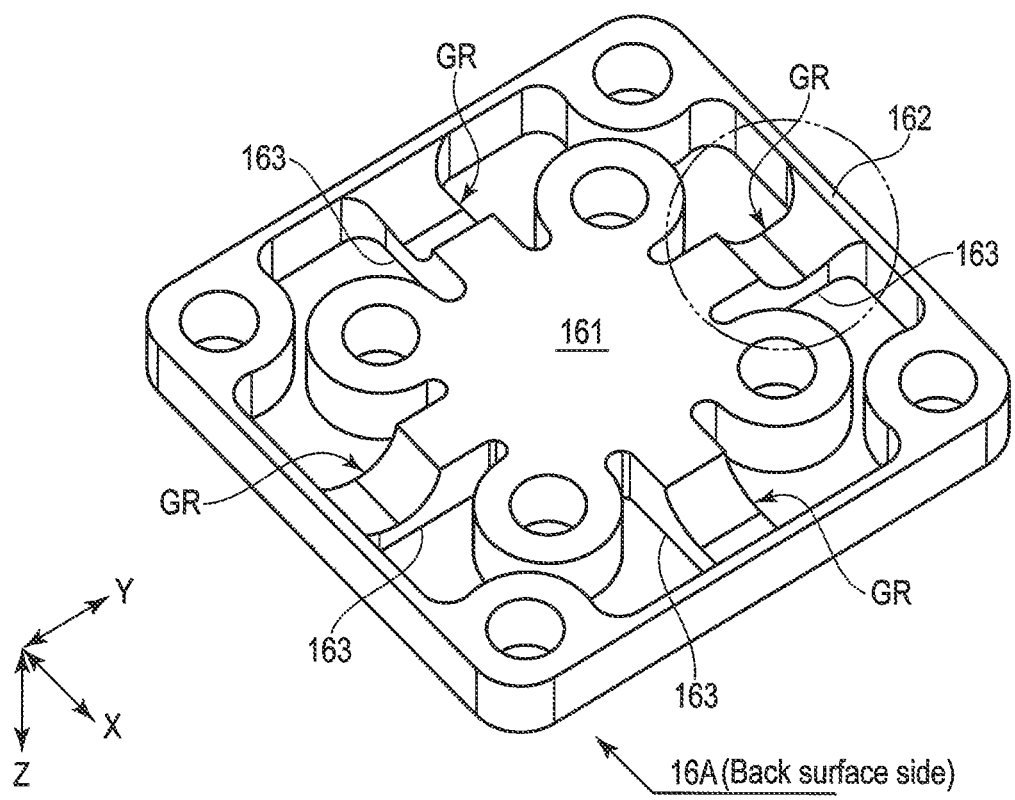
FIG. 8 is a perspective view showing an overall structure of a strain body according to a second embodiment as viewed from its back side.
Figure 9:
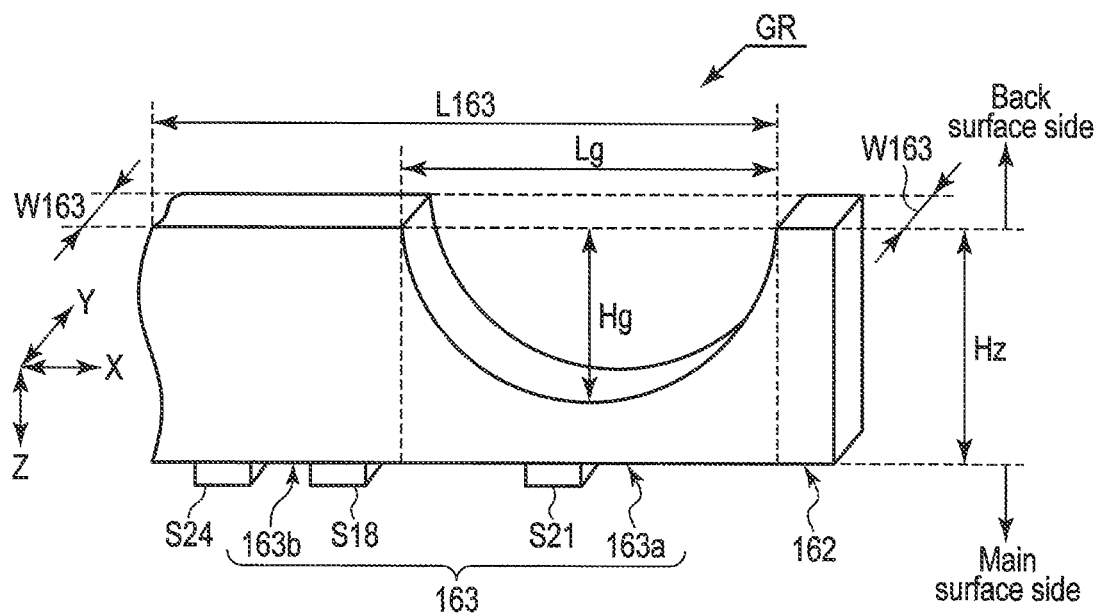
FIG. 9 is an enlarged cross-sectional view showing a strain increasing portion surrounded by a broken line in FIG. 8.

A strain body 16A according to a second embodiment will be described with reference to FIG. 8 to FIG. 10. The second embodiment relates to an example of comprising a groove (groove structure) GR as a strain increasing portion at the connecting portion on the back surface side of the strain body. FIG. 8 is a perspective view showing an overall structure of a strain body 16A according to a second embodiment as viewed from its back side. FIG. 9 is an enlarged cross-sectional view showing a strain increasing portion surrounded by a broken line in FIG. 8.

As shown in FIG. 8 and FIG. 9, the strain body 16A according to the second embodiment further comprises a strain increasing portion GR for increasing the generated strain more than a second connecting portion 163b (i.e., second portion) adjacent to the central portion 161, on the back surface side of each first connecting portion 163a (i.e., first portion) adjacent to the outer peripheral portion 162. In other words, the strain increasing portion GR is configured such that the strain generated in the first connection portion 163a on the back surface side is larger than the strain generated in the second connecting portion 163b. Here, the strain increasing portion GR is a predetermined groove (groove structure) formed by hollowing out a part of the back surface side of the first connecting portion 163a in a U shape. Since the groove is shaped in an arch such that its thickness increases from the center toward the outer peripheral portion 162 and the central portion 161, the groove is configured to be recessed in the thickness direction (Z direction) of the strain body 16.

The height Hg from the back surface of the strain increasing portion GR and the length Lg of the first connecting portion 163a can be appropriately set under predetermined conditions that the first connecting portion 163a is not plastically deformed when force and torque are applied. For example, the height Hg of the strain increasing portion GR from the back surface is, desirably, approximately 30% or more and 60% or less of the height Hz of the strain body 16. For example, the length Lg of the strain increasing portion GR is, desirably, approximately 30% or more and 70% or less of the entire length L163 of the connecting portion 163. The width W163 of the connecting portion 163 is the same in the first and second connecting portions 163a and 163b.

In addition, eight strain sensors (first strain sensors) S21 and the like that construct the bridge circuit are provided in the first connecting portion 163a. The second connecting portion 163b is provided with sixteen strain sensors (second strain sensors) S18, S24, and the like that construct the full bridge circuit. The details will be explained in detail with reference to FIG. 10.

FIG. 10 is a perspective view showing an overall structure of the strain body 16A according to the second embodiment as viewed from its main surface side. In FIG. 10, illustration of the same configuration as the electrode, the wire, and the like is omitted.

In FIG. 10, as shown by enlarging a portion surrounded by a broken line, eight strain sensors (first strain sensors) S3, S5, S11, S13, S19, S21, S27, and S29 constructing the bridge circuits BF2, BF4, BF6, and BF8 are provided at the first connecting portion 163a.

In the second connecting portion 163b, sixteen strain sensors (second strain sensors) S1, S2, S7, S8, S9, S10, S15, S16, S17, S18, S23, S24, S25, S26, S31, and S32 which construct the full bridge circuits BF1, BF3, BF5, and BF7 are provided. Eight strain sensors S1, S2, S15, S16, S17, S18, S25, and S26, of the second strain sensors provided in the second connecting portion 163b, are arranged adjacent to the grooves GR as compared with the other second strain sensors. For this reason, in the second strain sensors S1 and the like, too, the strain amount is increased and the sensor sensitivity is increased, similarly to the first strain sensor provided in the first connecting portion 163a.

Since the other structure is substantially the same as that of the first embodiment, their detailed descriptions will be omitted. In addition, the operations are also substantially the same as those in the first embodiment, and a detailed description thereof is omitted.

[Functions and Advantages]

According to the structure and the operation of the strain body 16A of the second embodiment, at least the similar functions and advantages as those of the first embodiment can be obtained.

Furthermore, the strain body 16A according to the second embodiment further comprises the strain increasing portion GR for increases the generated strain generated more than the second connecting portion 163b adjacent to the central portion 161, on the back surface side of each first connecting portion 163a adjacent to the outer peripheral portion 162. Here, the strain increasing portion GR is a predetermined groove (groove structure) formed by hollowing out a part of the back surface side of the first connecting portion 163a in a U shape (FIG. 8 and FIG. 9).

In the above-described structure, when force and torque are applied from the outside to the strain body 16A, the thickness of the first connecting portion 163a provided with the strain increasing portion GR is smaller than the thickness of the second connecting portion 163b, and the amount of deformation of the first connecting portion 163a according to the force and torque can be thereby increased as compared to the amount of deformation of the second connecting portion 163b.

Eight first strain sensors S3 and the like provided in the first connecting portions 163a construct four bridge circuits BF2, BF4, BF6, and BF8 together with eight reference resistors RS4 and the like (FIG. 10). For this reason, according to the strain body 16A according to the second embodiment, the detection accuracy of four bridge circuits BF2, BF4, BF6, and BF8 can be further improved by increasing the strain amount of the eight first strain sensors S3 and the like provided in the first connecting portion 163a.

Moreover, since eight strain sensors S1, S2, S15, S16, S17, S18, S25, and S26, of the second strain sensors provided in the second connecting portion 163b, are arranged adjacent to the grooves GR as compared with the other second strain sensors, the strain amount is also increased in the second strain sensors S1 and the like, similarly to the first strain sensors provided in the first connecting portion 163a. For this reason, the detection accuracy of the four full bridge circuits BF1, BF3, BF5, and BF7 constructed by the eight strain sensors S1 and the like can also be further improved. As a result, the detection accuracy in all the six axial directions related to the force and torque in the XYZ-axis directions can be improved.

For example, when force Fz in the Z-axis direction is applied to the strain body 16A according to the second embodiment, the strain amount of the eight strain sensors S3 and the like provided in the first connecting portion 163a can be increased by approximately 50% as compared with the strain sensors S3 and the like according to the first embodiment in the same case. Thus, the strain body 16A according to the second embodiment can be employed as necessary.

Third Embodiment (Example of Application to Force Sensor)

A third embodiment will be described with reference to FIG. 11 to FIG. 18. The third embodiment relates to an example of application of the strain body 16 according to the first embodiment to a force sensor. The force sensor according to the third embodiment is used in, for example, a robot arm, and is a six-axis force sensor for detecting force and torque in X, Y, and Z directions.

[Structure]

Figure 11:
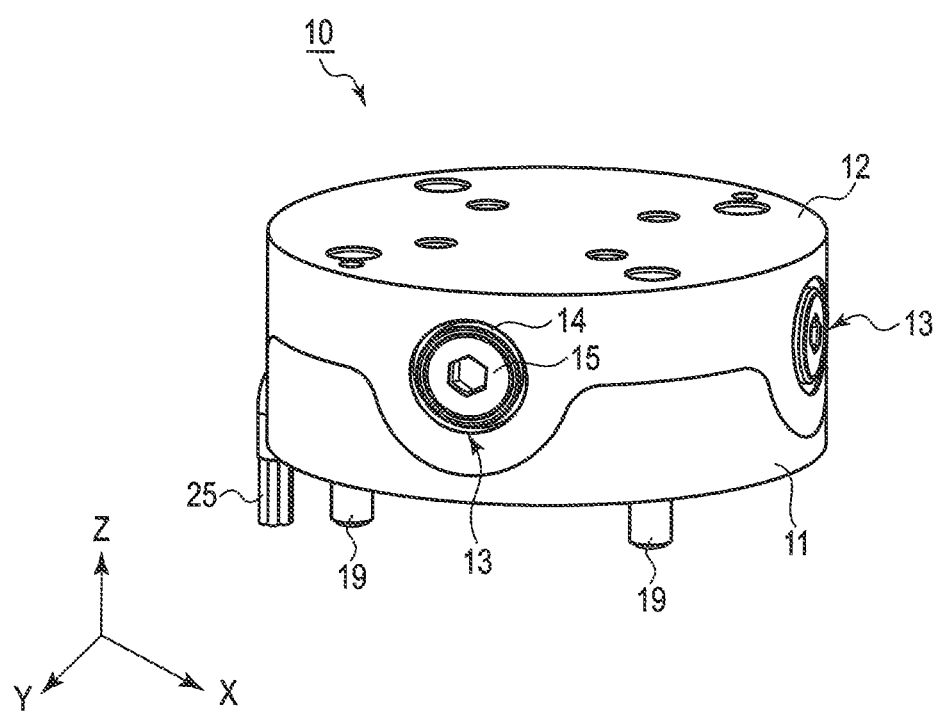
FIG. 11 is a perspective view showing an appearance of a force sensor equipped with the strain body according to the first embodiment.

FIG. 11 is a perspective view showing an appearance of a force sensor 10 provided with the strain body 16 according to the first embodiment. FIG. 12 is an exploded perspective view showing the force sensor 10 in FIG. 11.

As shown in FIG. 11 and FIG. 12, the force sensor 10 comprises a cylindrical main body 11 and a cylindrical movable body 12 which is movable with respect to the main body 11. The main body 11 is fixed to a main body of a robot arm not shown in the figures with a plurality of mounting screws 19 which penetrate a plurality of screw holes 19a formed in the bottom of the main body 11. The movable body 12 functions as a hand mounting plate for mounting a hand portion of the robot art not shown in the figures on its top surface.

The main body (base) 11 is a base member serving as the main body of the force sensor 10, and the movable body 12 is mounted so as to be movable in six-axis directions (an X-axis direction, a Y-axis direction, a Z-axis direction, and directions of rotation around the axes) with respect to the main body 10 with the strain body 16, which is elastically deformable, interposed therebetween.

That is, as shown in FIG. 12, a central portion 161 of the strain body 16 is fixed to the movable body (first support member) 12 with hand plate fixing screws 18 which penetrate screw holes 18a, respectively. An outer peripheral portion 162 of the strain body 16 is fixed to the main body 11 (second support member) with strain-body fixing screws 17 which penetrate screw holes 17a, respectively.

The main surface and the back surface of the strain body 16 are disposed in parallel to a plane formed by the X axis and the Y axis, and a line perpendicularly passing through a center O of the strain body 16 corresponds to the Z axis. In the above-described structure, when external force is applied to the movable body 12, the movable body 12 moves, and connecting portions 163 of the strain body 16 are deformed. As described above, strain sensors S1 to S32 are provided in the connecting portions 163 of the strain body 16, and the deformation of the strain body 16 is thereby detected as an electrical signal by the strain sensors S1 to S32.

For example, four circular opening portions 13 are provided at regular intervals, in the peripheral surface of the movable body 12. That is, the opening portions 13 are disposed in the X-axis direction and the Y-axis direction. The number of opening portions 13 is not limited to four, and may be any number greater than or equal to three. Stoppers 14 are disposed inside the opening portions 13, respectively, and the stoppers 14 are fixed to the main body 11 with stopper mounting bolts 15, respectively.

The stoppers 14 regulate the movement range of the movable body 12, and the outermost peripheral portions of the stoppers 14 are provided with first side surfaces 14a which the inner surfaces of the opening portions 13 can contact. That is, when the strain body 16 is deformed with the movement of the movable body 12, the inner surfaces of the opening portions 13 of the movable body 12 contact the first side surfaces 14a and the first side surfaces 14a function as protective mechanisms for protecting excessive deformation of the connecting portions 163 of the strain body 16.

A substrate 20 is provided in the main body 11 so as to face the strain body 16. The substrate 20 comprises a plurality of screw holes 21a, and is fixed to the main body 11 with fixing screws 21 which penetrate the screw holes 21a, respectively. The substrate 20 is electrically connected to strain sensors and the like provided on the strain body 16. The details will be described later.

A cover 22 closing an opening portion 11a is attached to the bottom of the main body 11. That is, the cover 22 comprises a plurality of screw holes 23a, and is fixed to the main body 11 with fixing screws 23 which penetrate the screw holes 23a, respectively.

A wire 25 for transmitting a detection signal to the outside is drawn to the side surface of the main body 11. The wire 25 is electrically connected to the substrate 20.

Strain Body in State of being Mounted in Force Sensor

Figure 13:
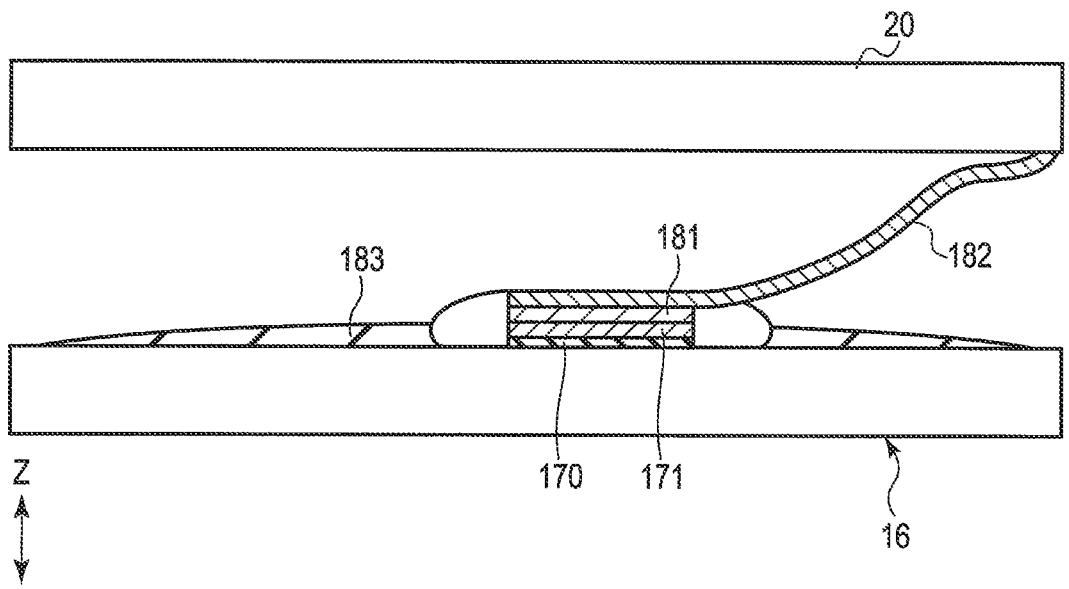
FIG. 13 is a cross-sectional view showing the strain body in the state of being mounted in the force sensor.

The strain body 16 in the state of being mounted in the force sensor 10 will be described in detail with reference to FIG. 13. FIG. 13 is a cross-sectional view showing the strain body 16 in the state of being mounted in the force sensor 10.

As shown in FIG. 13, an insulating film 170 is provided on the main surface of the strain body 16, and an electrode 171 is provided on the insulating film 170. Furthermore, an anisotropic conductive film (ACF) 181 is provided on the electrode 171 to be mounted in the force sensor 10. A lead wire 182 for electrically connecting the electrode 171 and the substrate 20 is provided on the anisotropic conductive film 181. The lead wire 182 comprises an insulating flexible film and a predetermined electric circuit laid on the film, and is flexible printed circuits (FPCs) configured to be bendable in accordance with the movement of the movable body 12. In addition, a protective sealant 183 is provided so as to cover the main surface of the strain body 16.

[Detecting Operation]

The detection operation of the force sensor 10 having the above-described structure will be briefly described. Detection of an external force (load) applied to a substantially central portion of the movable body 12 in the Z-axis direction will be described here as an example.

When an external force is applied to the substantially central portion of the movable body 12 in the Z-axis direction, the movable body 12 is moved downward along the Z-axis direction by the external force. Since the main body 11 is fixed and is not moved even by the external force, the movable body 12 moves downward until the inner surfaces of the opening portions 13 on the upper side contact the first side surfaces 14a of the stoppers 14 on the upper side.

For this reason, the bottom surface of the movable body 12 applies pressure to the top surface of the strain body 16, and the connecting portions 163 of the strain body 16, to which pressure has been applied, are deformed. Since the deformation of the strain body 16 is limited to a predetermined range by the stoppers 14, the strain body 16 is protected from destruction by excessive external force. The deformation of the strain body 16 is detected by the above-described strain sensors and reference resistors, and converted into an electrical signal by the bridge circuits and the full bridge circuits BF1 to BF8. The detected electrical signal is passed from the electrode 171 through the lead wire 182 and the substrate 20 and transmitted to the outside via the wiring 25, and the external force can be detected.

After that, when the application of the external force to the movable body 12 is removed, the connecting portions 163 of the strain body 16 return to an original shape by elastic deformation.

The external-force detection operation in the Z axis direction has been herein described as an example. The same is true of the other external-force detection operations in the X-axis direction and the Y-axis direction. In addition, each of the torque detection operations in the X-axis, Y-axis, and Z-axis directions is also substantially the same as the above-described external-force detection operation, and thus, a detailed description thereof will be omitted.

[Anisotropic Conductive Film (ACF)]

To electrically connect the terminal of the electrode 171 and the terminal of the lead wire 182 which is an FPC to each other by using the anisotropic conductive film 181, three processes (ST1 to ST3), i.e., ACF transfer (lamination) process, FPC position adjustment (alignment) process, and pressure-bonding and curing process are mainly required.

Figure 14:
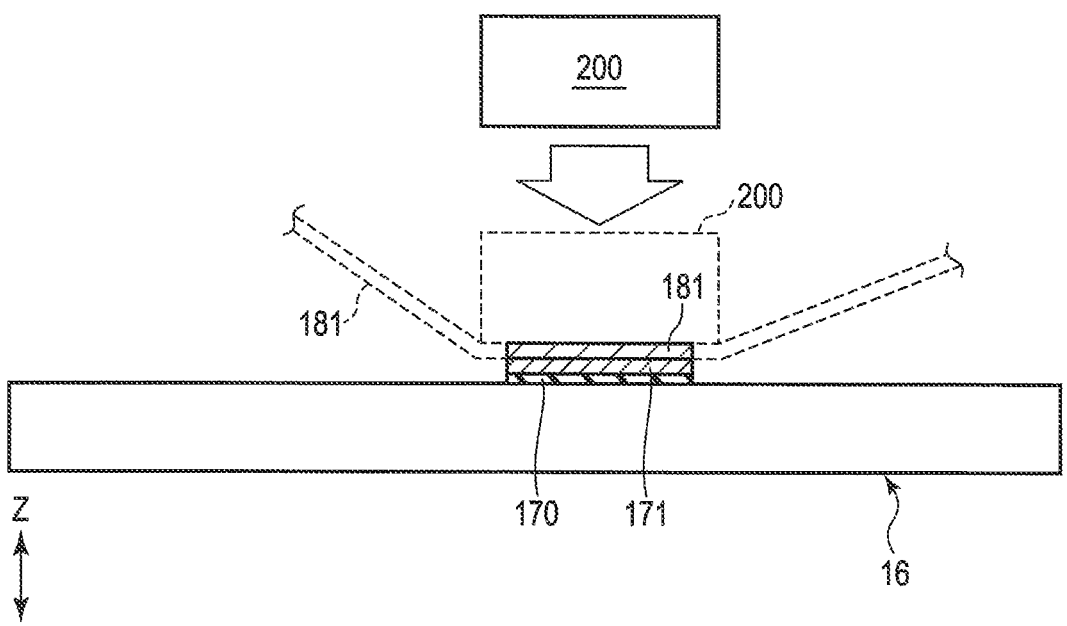
FIG. 14 is a cross-sectional view showing a method of connecting an electrode and a lead wire with an anisotropic conductive film on the strain body in FIG. 13.

FIG. 14 is a cross-sectional view illustrating a method of connecting an electrode and a lead wire with an anisotropic conductive film on the strain body shown in FIG. 13. As shown in FIG. 14, in the ACF transfer process, an anisotropic conductive film 181 having an area sufficiently larger than the area of the electrode 171 is disposed on the electrode 171 disposed on the main surface of the strain body 16, in a state of keeping a predetermined tension. Next, a head 200 for ACF bonding is lowered from just above the anisotropic conductive film 181 to the surface of the electrode 171 while maintaining the tension, and the redundant anisotropic conductive film 181 larger than the area of the electrode 171 represented by a broken line is cut away. As a result, the predetermined anisotropic conductive film 181 is transferred onto the electrode 171 (ST1).

Figure 15:
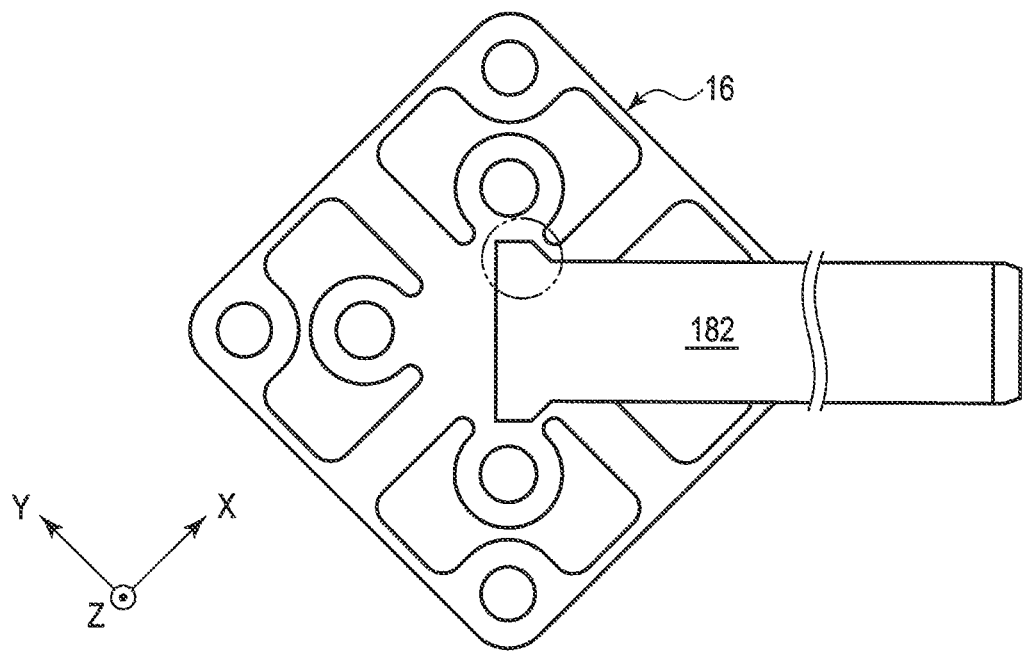
FIG. 15 is a plan view showing a state where the strain body and an anisotropic conductive film in FIG. 13 are arranged at predetermined positions.
Figure 16:
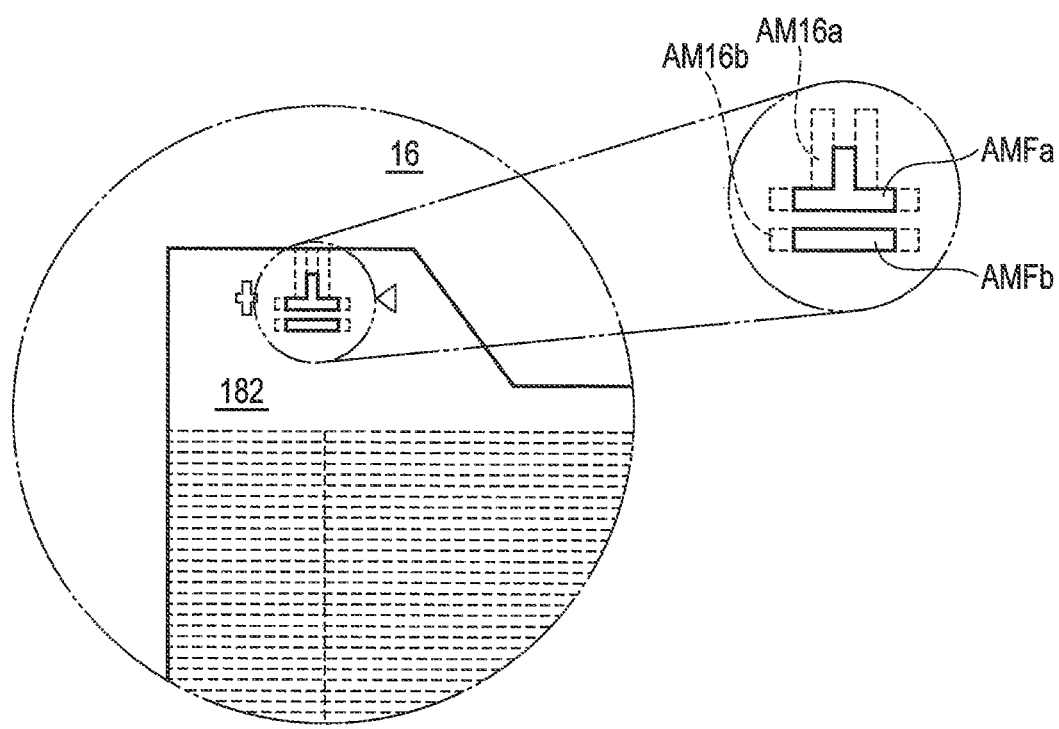
FIG. 16 is an enlarged plan view showing a portion surrounded by a solid line in FIG. 15.

FIG. 15 is a plan view showing a state where the strain body 16 and the anisotropic conductive film 181 in FIG. 13 are arranged at predetermined positions. FIG. 16 is an enlarged plan view showing a portion surrounded by a solid line in FIG. 15. In the FPC alignment process, the terminal of the electrode 171 and the terminal of the lead wire 182 are aligned in a state where the anisotropic conductive film 181 is stuck on the electrode 171.

As shown in FIG. 15 and FIG. 16, positioning is performed by aligning an alignment mark AM16 provided on the strain body 16 with an alignment mark AMF provided on the lead wire 182 at a predetermined position, in this process. For example, the positions of alignment marks AM16a and AM16b of the strain body 16 represented by a broken line and positions of alignment marks AMFa and AMFb of the lead wire 182 represented by the solid line are determined to have a positional relationship shown and enlarged in FIG. 16. At this time, the alignment is performed such that one protruding portion of the alignment mark AMFa of the lead wire 182 is sandwiched between two protruding portions of the alignment mark AM16a of the strain body 16, and displacement in the longitudinal direction of the paper surface is thereby prevented. In addition, displacement in the lateral direction of the paper surface is prevented by performing the alignment such that the alignment mark AM16b of the strain body 16 and the alignment mark AMFb of the lead wire 182 overlap (ST2).

Figure 17:
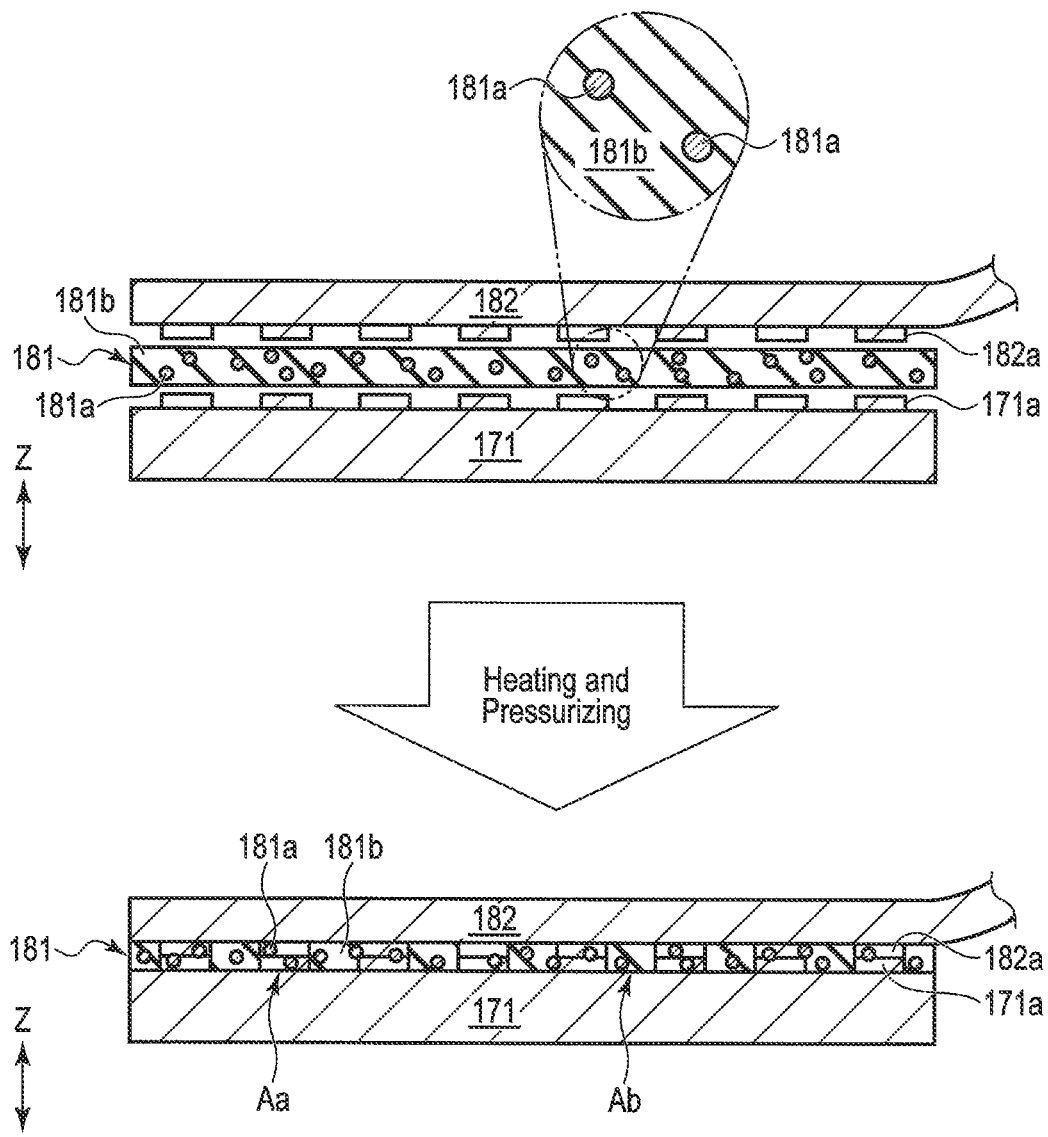
FIG. 17 is a cross-sectional view schematically showing that an electrode and a lead wire are electric connected with an anisotropic conductive film.

FIG. 17 is a cross-sectional view for schematically illustrating that a terminal of the electrode 171 and a terminal of the lead wire 182 are electric connected with the anisotropic conductive film 181. As shown in the upper part of FIG. 17, the anisotropic conductive film 181 has a structure in which conductive particles 181a serving as a conductor are dispersed almost uniformly in a thermosetting resin 181b serving as an insulator. Then, in the pressure-bonding and curing process, a target stacked body (electrode 171, anisotropic conductive film 181, and lead wire 182) is pressurized while being heated, by a predetermined head 200 from above the lead wire 182, in a state in which terminals 171a (PAD) of the electrode 171 and terminals 182a (PAD) of the lead wire 182 are aligned.

Then, as shown in the lower part of FIG. 17, the conductive particles 181a in the anisotropic conductive film 181 are connected to each other by pressure, and a conductive path is formed to electrically connect the terminals 171a and 182a in the longitudinal direction (Z-axis direction) in the drawing, at positions Aa sandwiched by the terminals 171a and 182a. On the other hand, at positions Ab other than these, the conductive particles 181a in the anisotropic conductive film 181 are not connected to each other and the insulating property is maintained since the pressure is low. As a result, a desired conductive path in the longitudinal direction (Z-axis direction) in the drawing is formed only at the positions Aa sandwiched between the terminals 171a and 182a (ST3).

The other structures and operations are substantially the same as those in the first embodiment, and thus, a detailed description thereof is omitted.

[Functions and Advantages]

According to the structures and the operations of the force sensor 10 according to the third embodiment comprising the strain body 16, at least the same advantageous effects as those of the first embodiment can be obtained.

Furthermore, in predetermined processes (ST1 to ST3), the strain body 16 according to the third embodiment electrically connects the terminals 171a of the electrode 171 and the terminals 182a of the lead wire 182, which is an FPC, to each other, by using the anisotropic conductive film 181 (FIG. 14 to FIG. 17).

Thus, the large number of terminals 171a and 182a of the electrode 171 and the lead wire 182 can be connected at one time, and the conductivity and the insulation can be maintained together, which is advantageous for reduction of the manufacturing costs, by collecting the wire 172 to the central portion 161 and using the anisotropic conductive film 181.

Moreover, reliable electric connection can be secured and reliability can be improved, even in the limited space of the strain body 16, at a fine pitch at which the distance between the adjacent terminals 171a and 182a in the lateral direction is, for example, approximately 0.2 mm, similarly to the present embodiment.

In addition, since the mounting device is lighter and thinner than connection devices such as solder and connectors, the mounting space can be reduced.

Figure 18:
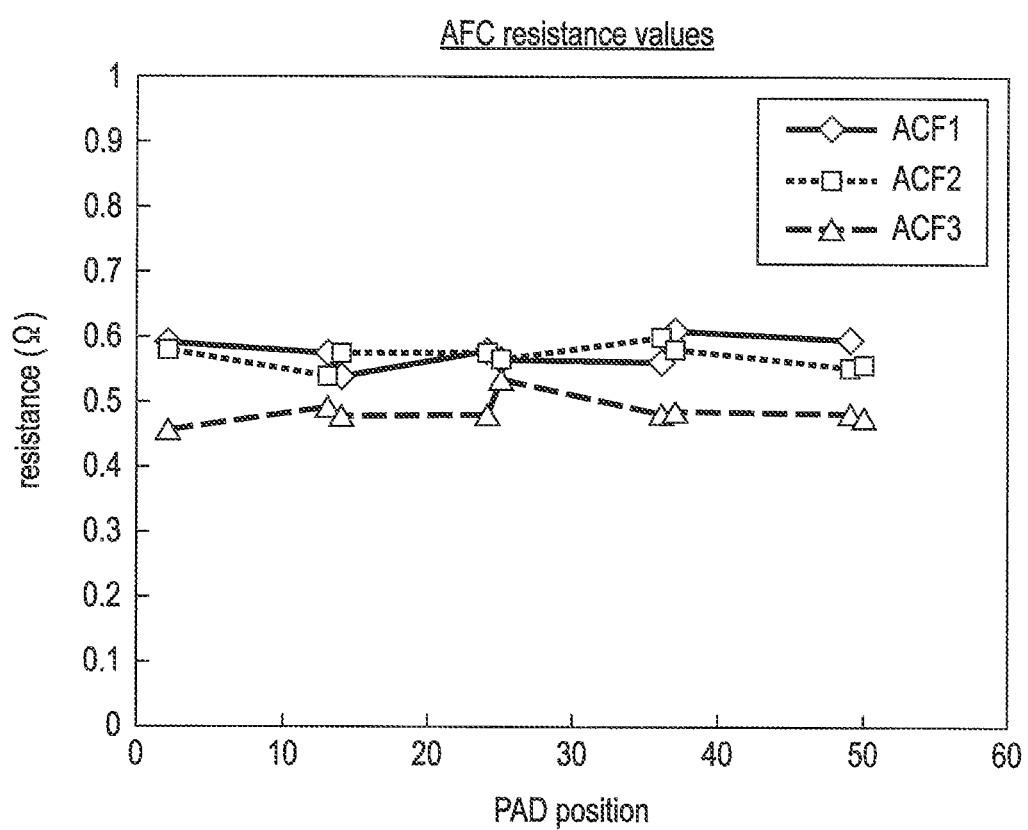
FIG. 18 is a graph showing a relationship between a position of an electrode pad and resistances of anisotropic conductive films.

For example, a relationship between a position of a pad (a position of a terminal) of the strain body 16 according to the present embodiment and resistances of anisotropic conductive films is shown in FIG. 18. As shown in FIG. 18, since the resistance value is almost constant regardless of the position of the pad, in any of the three anisotropic conductive films ACF1 to ACF3, a reliable electrical connection is understood to be secured. In addition, if the resistance value, approximately 0.1Ω, of the terminal 182a of the lead wire 182 is subtracted from the resistance values shown in FIG. 18, the substantial resistance values of the three anisotropic conductive films ACF1 to ACF3 are approximately 0.35Ω to 0.45Ω. The resistance values are values sufficiently lower than a reference value of a resistance value of a general anisotropic conductive film.

In addition, the force sensor 10 restricts the range of operation of the movable body 12, and comprises the stoppers 14 comprising the first side surfaces 14a, which can contact the inner surfaces of the opening portions 13, on their outermost peripheral portions. Thus, the stoppers 14 have a very simple shape, and have a protective function for all the six-axis directions. As a result, the force sensor 10, which is highly sensitive and has an advantage in reducing a manufacturing cost, can be provided.

Fourth Embodiment (Example of Other Arrangement of Strain Sensor)

A fourth embodiment will be described with reference to FIG. 19. The fourth embodiment relates to an example of the other arrangement of the strain sensor. FIG. 19 is a perspective view showing an overall structure of the strain body 16B according to the fourth embodiment as viewed from its main surface side.

As shown and enlarged in FIG. 19, the strain body 16B according to the fourth embodiment is different from the strain body 16A according to the second embodiment with respect to a feature that eight second strain sensors S1, S2, S15, S16, S17, S18, S25, and S26 provided in the second connecting portion 163b are arranged to have a sufficient distance LS from the groove GR to the same extent as the other second strain sensors. For this reason, all the second strain sensors provided in the second connecting portion 163b are not affected by the strain increasing effect from the groove GR. The distance LS is desirably set such that the strain amount of the first strain sensor provided in the first connecting portion 163a is understood to be distinctly different by, for example, 50% from the strain amount of the second strain sensor provided in the second connecting portion 163b.

The other structures and operations are substantially the same as those in the second embodiment, and thus, a detailed description thereof is omitted.

[Functions and Advantages]

In the strain body 16B according to the fourth embodiment, eight second strain sensors S1, S2, S15, S16, S17, S18, S25, and S26 provided in the second connecting portion 163b are arranged to have a sufficient distance LS from the grooves GR to approximately the same extent as the other second strain sensors (FIG. 19).

For this reason, the second strain sensor provided in the second connecting portion 163b is not affected by the strain increase effect from the groove GR, and the strain amounts of the first strain sensors S3, S5, S11, S13, S19, S21, S27, and S29 provided in the first connecting portion 163a can be increased as compared with the strain amounts of the second strain sensor S1, S2, S7, S8, S9, S10, S15, S16, S17, S18, S23, S24, S25, S26, S31, and S32 provided in the second connecting portion 163b. As a result, the detection accuracy of the four bridge circuits BF2, BF4, BF6, and BF8 can be improved.

In addition, since all the second strain sensors provided in the second connecting portion 163b are not affected by the strain increasing effect from the groove GR, the strain amount of the second strain sensors can be made uniform.

Modified Example

While the first to fourth embodiments have been described as examples, the embodiments of the present invention are not limited to the above-described first to fourth embodiments, and can be modified in various ways as necessary as a matter of course.

Objects to which the strain bodies 16, 16A, and 16B are applicable are not limited to the force sensor 10 described in the third embodiment, and they can be applied to various types of sensor as a matter of course.

The present invention is not limited to the embodiments described above, and the constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted. Furthermore, the constituent elements described in different embodiments may be arbitrarily combined.

What is claimed is:

1. A strain body comprising:
a central portion;
an outer peripheral portion surrounding the central portion;
connecting portions connecting the central portion and the outer peripheral portion, and each connecting portion comprising a first portion adjacent to the outer peripheral portion and a second portion adjacent to the central portion;
strain sensors provided on main surfaces of the connecting portions;
reference resistors provided on a main surface of the central portion, and constructing a bridge circuit with the strain sensors;
a strain increasing portion configured to increase strain occurring at the first portion more than strain occurring at the second portion, on a back surface side opposed to the main surface of the first portion; and
a groove configured to be recessed in a thickness direction of the strain body as the strain increasing portion.

2. The strain body of claim 1, wherein at least one of the strain sensors constructing the bridge circuit are provided on the main surface of the first portion.

3. The strain body of claim 2, further comprising:
a full bridge circuit which is provided on the main surface of the second portion, and to which a pair of serially connected strain sensors among the strain sensors are connected in parallel.

4. A strain body comprising:
a central portion;
an outer peripheral portion surrounding the central portion;
connecting portions connecting the central portion and the outer peripheral portion, and each connecting portion comprising a first portion adjacent to the outer peripheral portion and a second portion adjacent to the central portion;
strain sensors provided on main surfaces of the connecting portions;
reference resistors provided on a main surface of the central portion, and constructing a bridge circuit with the strain sensors;
a strain increasing portion configured to increase strain occurring at the first portion more than strain occurring at the second portion, on a back surface side opposed to the main surface of the first portion, wherein
the central portion is connected to a first support member provided outside,
the outer peripheral portion is connected to a second support member provided outside, and
elasticity of the outer peripheral portion and the connecting portions is larger than elasticity of the central portion.

5. The strain body of claim 4, wherein at least one of the strain sensors constructing the bridge circuit are provided on the main surface of the first portion.

6. The strain body of claim 5, further comprising:
a full bridge circuit which is provided on the main surface of the second portion, and to which a pair of serially connected strain sensors among the strain sensors are connected in parallel.

7. A force sensor comprising:
a strain body including:
a central portion;
an outer peripheral portion surrounding the central portion;
connecting portions connecting the central portion and the outer peripheral portion, and each connecting portion comprising a first portion adjacent to the outer peripheral portion and a second portion adjacent to the central portion;
strain sensors provided on main surfaces of the connecting portions;
reference resistors provided on a main surface of the central portion, and constructing a bridge circuit with the strain sensors; and
a strain increasing portion configured to increase strain occurring at the first portion more than strain occurring at the second portion, on a back surface side opposed to the main surface of the first portion;
a cylindrical main body; and
a cylindrical movable body capable of operating to the main body, wherein:
the central portion of the strain body is connected to one of the main body and the movable body, which are support members, and
the outer peripheral portion of the strain body is connected to the other of the main body and the movable body, which are support members.

8. The force sensor of claim 7, further comprising:
at least three circular opening portions provided at regular intervals on a surrounding of the movable body;
stoppers arranged inside the respective opening portions, and each comprising a first side surface having a first outer diameter smaller than a diameter of each of the opening portions; and
fixing members fixing the stoppers to the main body.

* * * * *